Figure 1:
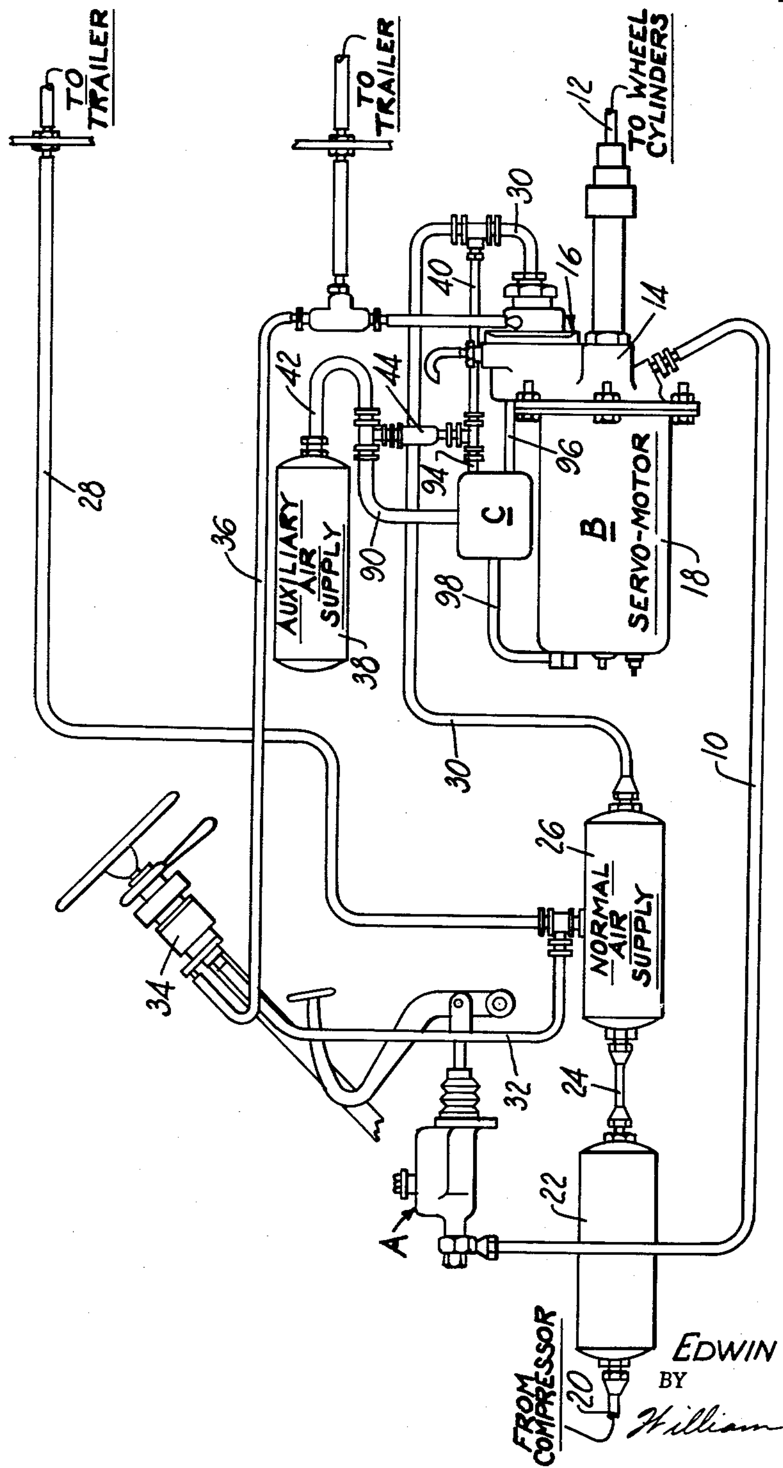

June 27, 1961 E. E. PRATHER 2,989,973

VALVE CONSTRUCTION

Original Filed July 2, 1956 2 Sheets-Sheet 1

INVENTOR.
EDWIN E. PRATHER
BY
William P. Hickey
ATTORNEY

June 27, 1961 E. E. PRATHER 2,989,973

VALVE CONSTRUCTION

Original Filed July 2, 1956

2 Sheets-Sheet 2

INVENTOR.
EDWIN E. PRATHER
BY
William P. Hickey
ATTORNEY

2,989,973
VALVE CONSTRUCTION

Edwin E. Prather, South Bend, Ind., assignor to The Bendix Corporation, a corporation of Delaware

Original application July 2, 1956, Ser. No. 595,192, now Patent No. 2,910,326, dated Oct. 27, 1959. Divided and this application Apr. 3, 1959, Ser. No. 803,900
1 Claim. (Cl. 137—113)

The present application is a division of my copending application Serial No. 595,192, filed July 2, 1956, now Patent No. 2,910,326.

An object of the present invention is the provision of a new and improved valve means for a pneumatically operated automotive braking system comprising a normal and an auxiliary source of pressure energy, and which means utilizes the auxiliary source to automatically and completely apply the brakes when the normal supply would no longer be capable of doing so.

A further object of the invention is the provision of a new and improved valve means for a braking system of the above described type in which the means produces an automatic application that is beyond the control of the operator of the vehicle to insure that the vehicle comes to a standstill and the failure of the normal braking system is investigated.

A further object of the invention is the provision of a new and improved valve means for a braking system of the above described type in which the valve means produces an automatic and gradual application such that the vehicle can be kept under control at all times.

Another object of the invention is the provision of a new and improved valve means for pneumatically actuated automotive braking system powered by a fluctuable pneumatic pressure supply differing from atmospheric pressure and comprising a reservoir connected to and fed by the fluctuable pressure supply, said valve means isolating the reservoir from its supply when the differential pressure between the supply and the atmosphere decreases below that between the reservoir and the atmosphere, and said means also automatically isolating the normally used brake applying control valve and communicating the reservoir to the vehicle brake applying fluid pressure motor to provide a complete application of its brakes when the differential between the atmosphere and the normal pressure supply is no longer capable of doing so.

A still further object of the invention is the provision of a control valve which will perform the above stated functions; which is inexpensive to manufacture, rugged in construction, and efficient in operation and which can be added to existing systems.

Figure 2:
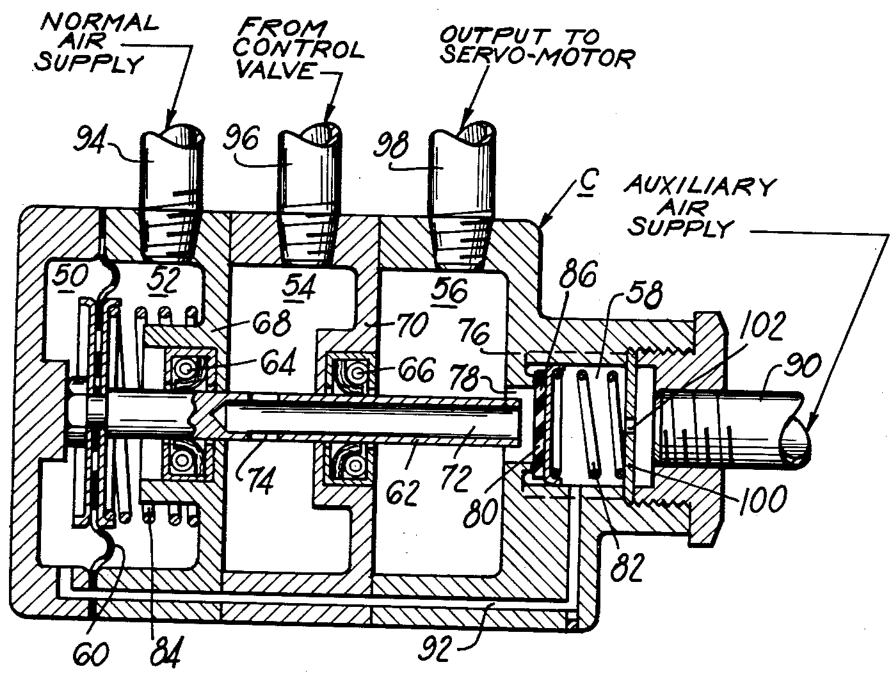

Further objects and advantages will be apparent to those skilled in the art to which the invention relates from the following description of the preferred embodiment described with reference to the accompanying drawings forming a part of this specification, and in which:

FIGURE 1 is a schematic drawing of a portion of the pneumatic power actuating system for the brakes of an automotive vehicle; and FIGURE 2 is a cross sectional view of a control valve used in the system shown in FIGURE 1.

The braking system shown in FIGURE 1 generally comprises a foot pedal lever operated master cylinder A, the hydraulic output of which is communicated through line 10 to a pneumatic fluid pressure servomotor B of well known construction, and thence through the hydraulic output line 12 to the wheel cylinders, not shown, of the tractor portion of a tractor-trailer truck. The hydraulic cylinder portion 14 of the servomotor B is of a type containing a check-valved passage in its power piston which permits pressure from the master cylinder A to be communicated directly to the tractor wheel cylinders when the servomotor B is not power actuated. The servomotor B is also provided with internal passages which communicate the hydraulic input signal from the line 10 to a hydraulically actuated pneumatic control valve 16 integrally mounted on the unit. The control valve structure 16 regulates the flow of compressed air to the back side (left side as seen in FIGURE 1) of the power cylinder 18 of the servomotor B and thereby causes the hydraulic output pressure of line 12 to be intensified by an amount approximately directly proportional to the intensity of the input signal of line 10. For a more complete understanding of the construction and operation of the servomotor B shown in the drawings, reference may be had to Patent 2,661,598 issued to T. H. Thomas.

The pneumatic pressure supply system for the servomotor B will generally include an air compressor (not shown) driven by the tractor motor. Air under pressure from the compressor flows through line 20 to a wet tank 22 where entrained moisture is separated, and thence through line 24 to a reservoir 26 adapted to smooth out pulsations in the system. Clean dry air is communicated to the trailer of the tractor-trailer truck by means of line 28, only a portion of which is shown, and to the servomotor B by means of line 30. A branch line 32 also supplies clean dry compressed air to a hand control valve 34 mounted upon the steering column of the tractor, and which is adapted to provide control air pressure for the brakes of the truck's trailer portion through line 36. Clean dry compressed air is also supplied to an auxiliary reservoir 38 through branch lines 40 and 42, and check valve 44. Air pressure in the portion of the system upstream of the check valve 44 normally fluctuates with usage and may be seriously depleted by mechanical failure in the supply system. The check valve 44 is so arranged as to close off communication between the auxiliary tank 38 and the line 40 when pressure in the line 40 decreases. Air pressure stored in the auxiliary reservoir 38 is not normally used to actuate the brakes of the vehicle, and will therefor remain at an intensity comparable to the maximum put out by the vehicle air compressor.

According to the principles of the present invention there is provided valve means interpositioned between the control valve 16 and the servomotor B which will overrule control by means of control valve 16 and automatically dump high pressure air from the auxiliary reservoir 38 into the servomotor B to provide an application of the brakes of the vehicle.

Referring to FIGURE 2 of the drawings, it will be seen that the valve means C comprises five aligned chambers 50, 52, 54, 56 and 58. A movable wall or diaphragm 60 is provided between chambers 50 and 52, and the center of the diaphragm is attached to an axially extending rod or valve member 62 which projects through chambers 52 and 54, and well into chamber 56. Suitable pneumatic sealing means 64 and 66 are provided in the partition members 68 and 70 through which the valve member 62 extends; and the end of the rod 62 is drilled out to provide passages 72 and 74 for normally communicating chamber 54 with chamber 56. The partition member 76 between the chambers 56 and 58 is provided with an opening or valve port 78 therethrough which is normally closed off by a poppet 80 positioned in the chamber 58 and biased against the partition 76 by means of a coil spring 82. The drilled end of the movable valve member 62 is normally held out of engagement with the poppet valve 80 by means of a coil spring 84 interpositioned between the diaphragm 60 and the rigid partition 68 such that chambers 54 and 56 will normally be communicated. Upon movement of the movable valve member 62 to the right as shown in the drawing, the drilled end of the movable valve member 62 is caused to abut the resilient coating 86 on the poppet 80 and thereby close off communication between chambers 54 and 56. Continued movement to the right thereafter lifts poppet 80 away from the partition 76 and thereafter permits communication between chambers 56 and 58.

Air pressure from the auxiliary reservoir 38 is continually communicated to the chamber 58 of the control means C by means of the connection 90 and thence through the drilled passage 92 to the chamber 50. Normal service pressure is communicated to the chamber 52 on the opposite side of diaphragm 60 by means of connection 94.

During normal operation of the unit, output pressure from the control valve 16 of the servomotor passes through line 96 to the control means C and thence through line 98 to the back side of the servomotor. Communication between lines 96 and 98 continues through drilled passages 72 and 74 of the movable valve member 62 so long as the service air pressure in line 94 is maintained at a value within a predetermined differential from the pressure in line 90. Diaphragm 60 and spring 84 are so proportioned and constructed as to require a predetermined differential pressure between the normal pressure in chamber 52, and auxiliary pressure in chamber 50 before overriding control valve 16 and automatically applying the vehicle brakes. Too fast an application of the vehicle brakes may be prevented by an orifice 100 having a suitably sized opening 102 therein and positioned in the auxiliary supply line between the reservoir 38 and chamber 58.

Air compressors currently being used in automotive braking systems are provided with control means, sometimes called unloaders, which regulate the maximum pressure which the compressor puts out. The auxiliary reservoir 38 therefore will normally be held at a substantially constant pressure corresponding to that at which the unloader or control device is set. For this reason the pressure at which the control means C operates to automatically apply the brakes will for all intents and purposes be a predetermined or set pressure. Diaphragm 60 and spring 84 will normally be sized to make this predetermined pressure coincide with the minimum pressure at which normal braking of the vehicle can be had.

While the present invention has been described as embodied in a pneumatic powered braking system using compressed air as the actuating medium, it will be apparent that the invention may also be embodied in vacuum actuated braking systems. For the purposes of this specification and claims, it will be understood that the terms pressure or pressure energy include pressures or pressure energy at a level below as well as above atmospheric pressure.

It will be seen that the objects and advantages enumerated as well as others have been achieved. While the preferred embodiment of the invention has been described in considerable detail, I do not wish to be limited to the particular construction shown, which may be varied within the scope of the invention; and it is the intention to cover hereby all adaptations, modifications, and arrangements thereof which come within the practice of those skilled in the art to which the invention relates.

I claim:

A control valve comprising: a body member having first, second, third, fourth and fifth axially aligned pressure chambers each having an externally communicating flow port; a movable wall between the first and second chambers; a fixed portion between said fourth and fifth chambers having an axially positioned valve port therebetween; poppet valve means in said fifth chamber biased toward the fourth chamber to normally close off said valve port; means biasing said movable wall toward said first chamber; a rod connected to said movable wall and projecting through said second and third chambers into said fourth chamber, said rod having an axially extending opening therein communicating its end surface positioned in said fourth chamber with said third chamber, and said rod having a valve seat surrounding said opening in its end which is adapted to be closed by abutment with said poppet valve; whereby increased pressure differential between said first and second chambers closes off communication between the third and fourth chambers and opens communication between the fourth and fifth chambers.

References Cited in the file of this patent

UNITED STATES PATENTS

| | | |
|---|---|---|
| 2,171,316 | Van Sittert | Aug. 29, 1939 |
| 2,657,701 | Hupp | Nov. 3, 1953 |

FOREIGN PATENTS

| | | |
|---|---|---|
| 467,778 | Canada | Aug. 29, 1950 |
| 561,355 | Canada | Aug. 5, 1958 |